(No Model.)

A. J. & F. S. BEAVIS.
VELOCIPEDE.

No. 318,532.      Patented May 26, 1885.

Witnesses:
I. M. Wells
Arthur Keithley

Inventors.
Arthur J. Beavis,
Frank S. Beavis.
per A. B. Upham, their Attorney.

N. PETERS. Photo-Lithographer, Washington, D. C.

UNITED STATES PATENT OFFICE.

ARTHUR J. BEAVIS, OF MONMOUTH, AND FRANK S. BEAVIS, OF PEORIA, ILLINOIS.

VELOCIPEDE.

SPECIFICATION forming part of Letters Patent No. 318,532, dated May 26, 1885.

Application filed August 2, 1884. (No model.)

*To all whom it may concern:*

Be it known that we, ARTHUR J. BEAVIS, of Monmouth, Warren county, Illinois, and FRANK S. BEAVIS, of Peoria, in the county of Peoria, in the State of Illinois, have invented an improved Device for Propelling Bicycles; and we do hereby declare that the following is a full, clear, and exact description thereof, reference being had to the annexed drawings, making a part of this specification, in which like letters of reference refer to like parts, and in which—

Figure 1:
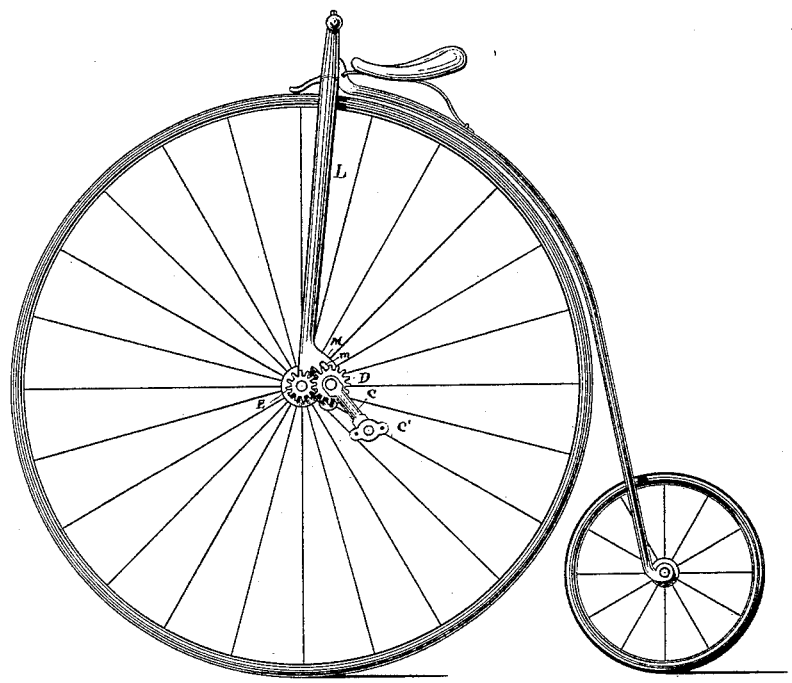
Figure 3:
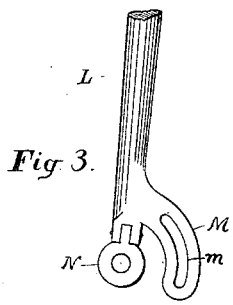
Figure 2:
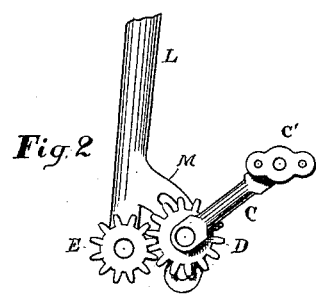
Figure 4:
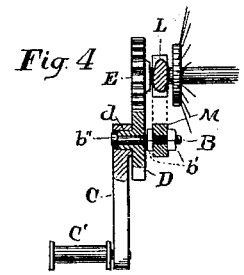

Figure 1 represents a side elevation of a bicycle having our device adapted thereto; Fig. 2, a similar elevation, on a larger scale, of our device; Fig. 3, a view of portion of bicycle-forks; Fig. 4, a sectional plan view of the invention, and Fig. 5 a side view of a modification thereof.

This invention is in the line of bicycle-propelling devices in which the downward pressure of the rider's foot upon the pedal of a crank-arm communicates a rotary motion thereto and from thence to the drive-wheel of the bicycle.

Our improvements relate especially to means whereby the center of rotation of the bicycle's crank-arm may be sufficiently behind the axis of the drive-wheel as to secure immunity from "headers" to the rider. We have also devised means for adapting the crank-arm's axis to be, to a limited extent, vertically adjustable, and suit thereby different heights of riders. Lastly, our construction permits the relative rotation of the crank-arm and drive-wheel to be in unequal times, as may be desired.

Figure 5:
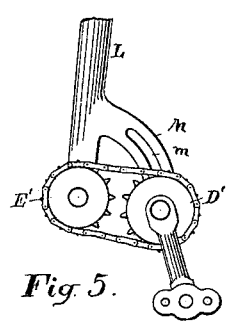

Our device is formed as follows: From near the lower extremity of each leg L of the forks extends a curved arm, M, having a slot, $m$, curved concentric with the drive-wheel's bearings N. Through the slot $m$ passes a bolt, B, rigidly held in place thereat by nuts $b$ $b'$, and upon said bolt is the spur-wheel D, having a small tubular hub, $d$, projecting therefrom, as in Fig. 4. A small head, $b''$, retains said wheel D in place upon the bolt B. To the hub $d$ is keyed or otherwise fastened the crank-arm C, at the outer extremity of which is the pedal C'. Upon each end of the drive-wheel's axle is fastened a spur-gear, E, adapted to mesh with the wheel D, previously described. By rotating the gear-wheel D the gear E is caused to revolve, and also the drive-wheel, which is rigidly connected therewith. If it is desired to turn the drive-wheel faster than the pedal, the gear E is made smaller than the pedal-gear D, while if a slower motion is wished the converse relation is made between said gears. It will be noticed that to give a forward motion to the bicycle the gear D and pedal C' must be turned backward. This therefore enables the rider to apply his downward pressure to the pedal C' when the same is in a vertical line between the supporting-points of the bicycle's wheels. The driver can therefore rest his entire weight upon a pedal, C', without bringing his center of gravity in front of the bicycle's drive-wheel and gaining thereby a header. The bearing-bolt B being capable of being moved to and fastened at any point of the slot $m$, the distance of the said bolt from the bicycle-saddle is made sufficiently variable to adjust the pedals C' conformably with the rider's reach. If it is preferred to have the pedals turn in the same direction as the drive-wheel, we substitute sprocket-wheels D' E' for the gears D E, and join the same together by chain belts, as shown in Fig. 5.

We are aware that previously to our invention gearings have been used to transmit the motion of the drive-pedals to the drive-wheel of a bicycle, and do not, therefore, broadly claim the same; but What we do claim as our invention, and for which we desire Letters Patent, is as follows:

In combination with the forks of a bicycle, the arms M, projecting rearwardly from the said forks, the spur-gears D, having tubular hubs $d$, held in said arms, crank-arms C, fast on said hubs, treadles C' projecting from said crank-arms, bolts B and nuts $b'$ for securing the gears D to the arms M, and the spur-gears E, fast on the ends of the drive-wheel's axle and arranged to mesh with said gears D, as and for the purpose set forth.

In testimony that we claim the foregoing invention we have hereunto set our hands this 29th day of July, 1884.

ARTHUR J. BEAVIS.
FRANK S. BEAVIS.

Witnesses:
S. B. UPHAM,
ARTHUR KEITHLEY.